United States Patent
Waga

(10) Patent No.: US 11,164,061 B2
(45) Date of Patent: Nov. 2, 2021

(54) IC CARD, PORTABLE ELECTRONIC DEVICE, IC CARD PROCESSING METHOD AND PROGRAM

(71) Applicants: KABUSHIKI KAISHA TOSHIBA, Minato-ku (JP); Toshiba Infrastructure Systems & Solutions Corporation, Kawasaki (JP)

(72) Inventor: Yoshihiro Waga, Kawasaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 16/687,782

(22) Filed: Nov. 19, 2019

(65) Prior Publication Data
US 2020/0160131 A1    May 21, 2020

(30) Foreign Application Priority Data
Nov. 21, 2018    (JP) .............................. JP2018-218392

(51) Int. Cl.
*G06K 19/07*    (2006.01)
*G06K 19/073*    (2006.01)

(52) U.S. Cl.
CPC ..... *G06K 19/0722* (2013.01); *G06K 19/0716* (2013.01); *G06K 19/07309* (2013.01)

(58) Field of Classification Search
CPC ........... G06K 19/0722; G06K 19/0716; G06K 19/07309; G07F 7/1008; H04W 12/06; G06Q 20/409; G06Q 20/40145; H04L 63/0861; H04L 9/3231; G06F 21/32
See application file for complete search history.

(56) References Cited

U.S. PATENT DOCUMENTS

| | | | |
|---|---|---|---|
| 9,615,322 B2* | 4/2017 | Choi | H04W 4/70 |
| 2005/0240778 A1* | 10/2005 | Saito | H04L 63/0428 |
| | | | 713/186 |
| 2007/0058843 A1 | 3/2007 | Theis et al. | |
| 2008/0180212 A1 | 7/2008 | Aikawa et al. | |
| 2008/0252412 A1 | 10/2008 | Larsson et al. | |
| 2013/0065564 A1* | 3/2013 | Conner | G06K 19/0718 |
| | | | 455/414.1 |

(Continued)

FOREIGN PATENT DOCUMENTS

| | | |
|---|---|---|
| JP | 2002-120670 A | 4/2002 |
| JP | 2002-351845 A | 12/2002 |

(Continued)

OTHER PUBLICATIONS

Extended European Search Report dated Mar. 16, 2020 in European Patent Application No. 19210425.5, 11 pages.

*Primary Examiner* — Sonji N Johnson
(74) *Attorney, Agent, or Firm* — Oblon, McClelland, Maier & Neustadt, L.L.P.

(57) ABSTRACT

According to an embodiment, an IC card comprises a sensor, a storage, and a processor. The sensor obtains information for authentication. The storage stores an authentication list showing one or more authentication methods which use information from the sensor. The processor determines whether if there is an abnormality exists in the sensor. If it determines that the sensor is indeed abnormal, it updates the authentication list accordingly.

11 Claims, 4 Drawing Sheets

| Priority | Authentication method | Condition |
|---|---|---|
| 1 | Fingerprint authentication | Transaction amount 10000 JPY or over |
| 2 | Offline PIN authentication | Transaction amount below 10000 JPY |
| 3 | Handwritten signature | Transaction amount below 10000 JPY |
| 4 | Online PIN authentication | Transaction amount below 10000 JPY |

(56) References Cited

U.S. PATENT DOCUMENTS

| | | | |
|---|---|---|---|
| 2013/0207786 A1* | 8/2013 | Hutzler | G06K 19/0718 340/10.51 |
| 2018/0211022 A1 | 7/2018 | Wagner et al. | |
| 2018/0308101 A1* | 10/2018 | Valencia | G06K 19/07739 |
| 2019/0180018 A1 | 6/2019 | Miura | |

FOREIGN PATENT DOCUMENTS

| | | |
|---|---|---|
| JP | 2009-500246 A | 1/2009 |
| WO | WO 2018/047949 A1 | 3/2018 |

* cited by examiner

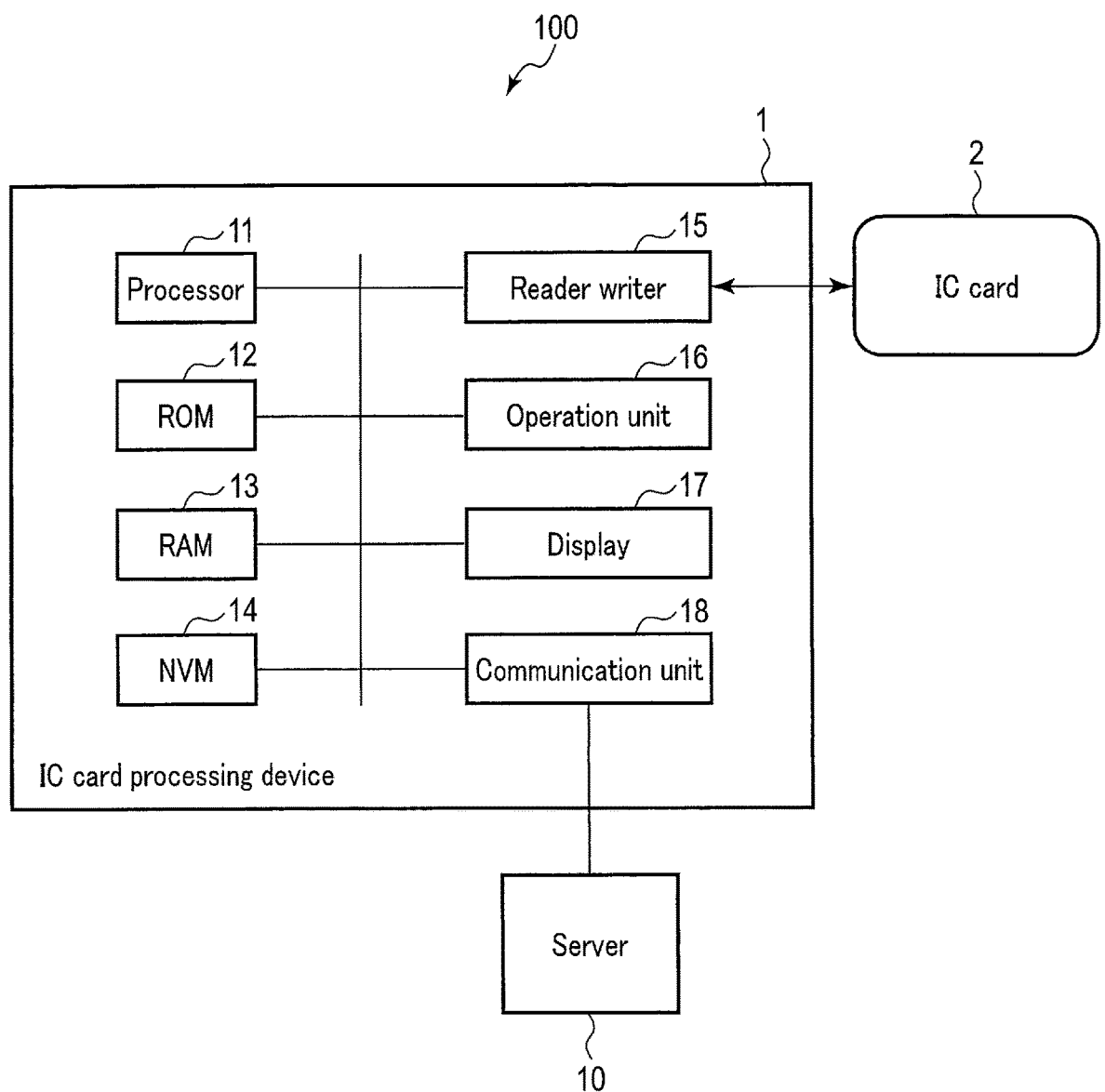
F I G. 1

| Priority | Authentication method | Condition |
|---|---|---|
| 1 | Fingerprint authentication | Transaction amount 10000 JPY or over |
| 2 | Offline PIN authentication | Transaction amount below 10000 JPY |
| 3 | Handwritten signature | Transaction amount below 10000 JPY |
| 4 | Online PIN authentication | Transaction amount below 10000 JPY |

| Priority | Authentication method | Condition |
| --- | --- | --- |
| 1 | Offline PIN authentication | Transaction amount 10000 JPY or over |
| 2 | Offline PIN authentication | Transaction amount below 10000 JPY |
| 3 | Handwritten signature | Transaction amount below 10000 JPY |
| 4 | Online PIN authentication | Transaction amount below 10000 JPY |

FIG. 4

| Priority | Authentication method | Condition |
| --- | --- | --- |
| 1 | Offline PIN authentication | Transaction amount below 10000 JPY |
| 2 | Handwritten signature | Transaction amount below 10000 JPY |
| 3 | Online PIN authentication | Transaction amount below 10000 JPY |

FIG. 5

IC CARD, PORTABLE ELECTRONIC
DEVICE, IC CARD PROCESSING METHOD
AND PROGRAM

CROSS-REFERENCE TO RELATED
APPLICATIONS

This application is based upon and claims the benefit of priority from Japanese Patent Application No. 2018-218392, filed Nov. 21, 2018, the entire contents of which are incorporated herein by reference.

FIELD

Embodiments described herein relate generally to an IC card, a portable electronic device, an IC card processing method and a program.

BACKGROUND

A portable electronic device such as an IC card comprises a sensor for obtaining biological information of a user such as a fingerprint sensor. Such a portable electronic device performs an authentication process based on information obtained through use of the sensor.

Conventionally, one issue surrounding the portable electronic device has been its inability to perform an authentication process when there is an abnormality in the sensor.

In order to resolve the above issue, the present disclosure offers an IC card, a portable electronic device, an IC card processing method and a program which allow the authentication process to continue even if an abnormality occurs in the sensor.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a diagram showing a configuration example of an IC card processing system according to an embodiment.

FIG. 4 is a diagram showing a configuration example of an authentication list according to an embodiment.

FIG. 5 is a diagram showing a configuration example of an authentication list according to an embodiment.

DETAILED DESCRIPTION

Figures 2, 3:
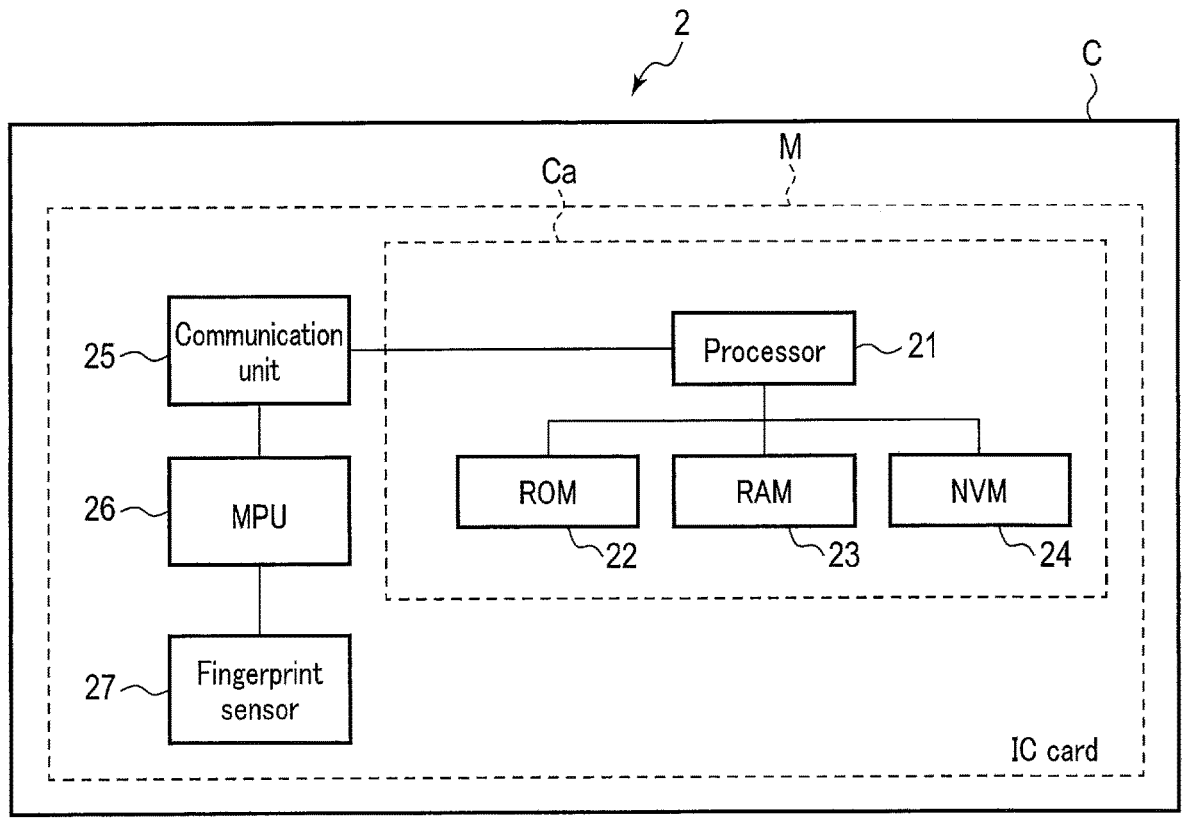
FIG. 2 is a block diagram showing a configuration example of an IC card according to an embodiment.
FIG. 3 is a diagram showing a configuration example of an authentication list according to an embodiment.

According to an embodiment, an IC card comprises a sensor, a storage, and a processor. The sensor obtains information for authentication. The storage stores an authentication list showing one or more authentication methods which use information from the sensor. The processor determines whether if there is an abnormality exists in the sensor. If it determines that the sensor is indeed abnormal, it updates the authentication list accordingly.

Hereinafter, certain embodiments will be described in detail with reference to the accompanying drawings.

An IC card processing system according to an embodiment authenticates a user who possesses the IC card. For example, the IC card processing system authenticates the user using the IC card inserted into an IC card processing device. The IC card processing system authenticates the user by a predetermined authentication method. More specifically, the IC card processing system may authenticate the user through PIN authentication, signature or fingerprint authentication.

For example, the IC card processing system authenticates the user of the IC card as either a cash card or a credit card (a cash card user or a credit card user). The IC card intended for the IC card processing system is not limited to a specific use or structure.

FIG. 1 is a block diagram showing a configuration example of an IC card processing system 100 according to an embodiment. As shown in FIG. 1, the IC card processing system 100 comprises an IC card 2 as a portable electronic device, an IC card processing device 1 as an external device for performing communication with the IC card 2, and a server 10. The IC card processing system 100 may, when necessary, comprise configurations other than those shown in FIG. 1, or omit specific configurations.

In the configuration example shown in FIG. 1, the IC card processing device 1 includes a processor 11, a ROM 12, a RAM 13, an NVM 14, a reader writer 15, an operation unit 16, a display 17 and a communication unit 18. The processor 11, ROM 12, RAM 13, NVM 14, reader writer 15, operation unit 16, display 17 and communication unit 18 are all mutually connected via a data bus. The IC card processing system 1 may comprise configurations other than those shown in FIG. 1 if necessary, or omit specific configurations.

The processor 11 has the function of controlling the operation of the entire IC card processing device 1. The processor 11 may comprise an inner cache and various interfaces. The processor 11 realizes various processing actions by executing a program pre-stored in an internal memory, or in the ROM 12 or NVM 14. The processor 11, by executing the program, implements a function of transmitting a command to the IC card 2 by the reader writer 15, and a function of performing various processing actions based on data such as responses received from the IC card 2. Through such functions, the processor 11 transmits an authentication command which includes data necessary for authentication, through the reader writer 15 to the IC card 2.

Some of the various functions realized by the program executed by the processor 11 may be realized by a hardware circuit. In this case, the processor 11 controls the functions performed by the hardware circuit.

The ROM 12 is a non-volatile memory in which a control program, control data, etc. have been stored in advance. The control program and the control data stored in the ROM 12 are incorporated depending on the specification of the IC card processing device 1 in advance. The ROM 12, for example, stores the program to be controlled on a circuit board of the IC card processing device 1.

The RAM 13 is a volatile memory. The RAM 13 temporarily stores processing data of the processor 11. The RAM 13 stores various application programs based on instruction from the processor 11. Further, the RAM 13 may store data necessary for executing the application programs and execution results of the application programs.

The NVM 14 is a non-volatile memory capable of writing and rewriting data. The NVM 14 is constituted by, for example, an HDD (Hard Disk Drive), an SSD (Solid State Drive) or a flash memory. The NVM 14 stores control programs, applications and various data depending on the operational use of the IC card processing device 1.

The reader writer 15 is an interface for transmitting/receiving data to/from the IC card 2. The reader writer 15 is constituted by an interface that fits the communication system adopted by the IC card 2.

For example, if the IC card 2 is a contact type IC card, the reader writer 15 is configured with a contact unit, etc. for physical and electrical connection to the contact section of the IC card 2.

If the IC card 2 is a non-contact type IC Card, the reader writer 15 is configured with an antenna, a communication control unit, etc. for performing wireless communication with the IC card 2. The reader writer 15 performs power supply, clock supply, reset control, and transmission/reception of data for the IC card 2.

Through execution of such functions, the reader writer 15 performs power supply to the IC card 2, activation (start) of the IC Card 2, clock supply, reset control, transmission of various commands, and reception of responses to transmitted commands, under the control by the processor 11.

The operation unit 16 receives inputs of various operation instructions from the user. The operation unit 16 transmits the data of operation instructions input by the user to the processor 11. The operation unit 16 is, for example, a keyboard, a ten key, and a touch panel. Further, the operation unit 16 may be a panel that accepts an input of signature.

The display 17 is a display device that displays various information under the control of the processor 11. The display 17 is, for example, a liquid crystal monitor. Furthermore, when the operation unit 16 is constituted by a touch panel, the display 17 may be integrally formed with the operation unit 16.

The communication unit 18 is an interface for data transmission/reception with the server 10. For example, the communication unit 18 connects to the server 10 through a communication network such as the Internet. The communication unit 18 is, for example, an interface for supporting LAN connection.

The server 10 manages the IC card processing device 1. For example, the server 10 receives and stores operation logs etc. from the IC card processing device 1.

Furthermore, the server 10 performs PIN authentication online (online PIN authentication). The server 10, for example, receives a PIN from the IC card processing device 1 and verifies the received PIN with a pre-registered PIN. The server 10 transmits the verification result to the IC card processing device 1.

The IC card 2 is activated (turns an operable state) through receiving a supply of power from an external device such as the IC card processing device 1. The IC card 2 may perform contact type communication or non-contact type communication with the IC card processing device 1.

Next, a configuration example of the IC card 2 will be explained.

FIG. 2 is a block diagram schematically showing a configuration example of the IC card 2 according to an embodiment. As shown in FIG. 2, the IC card 2 comprises a card-shaped body C formed from plastic etc. The IC card 2 includes a module M in the body C. The module M is an integral member in which an IC chip Ca, a communication unit 25, an MPU 26 and a fingerprint sensor 27 are connected with each other, and embedded in the body C of the IC card 2.

As shown in FIG. 2, the IC card 2 comprises the module M, etc. The module M comprises the IC chip Ca, communication unit 25, MPU 26, fingerprint sensor 27, etc. The IC chip Ca comprises a processor 21, a ROM 22, a RAM 23, an NVM 24, etc. The processor 21 is connected to the ROM 22, RAM 23, NVM 24 and communication unit 25 via a data bus, etc. The communication unit 25 connects to the MPU 26 via a data bus, etc. The MPU 26 connects to the fingerprint sensor 27 via a data bus, etc.

The IC card 2 may comprise other configurations from those shown in FIG. 2 when necessary, or omit specific configurations.

The processor 21 functions as a controller for controlling the entire IC card 2. The processor 21 performs various processing based on the control program and control data stored in the ROM 22 or NVM 24. For example, the processor 21 performs operation control of the IC card 2 or various processing depending on the operation of the IC card 2, by executing the program stored in the ROM 22.

Some of the various functions realized by the processor 21 performing a program may be realized by a hardware circuit. In this case, the processor 21 controls the functions performed by the hardware circuit.

The ROM 22 is a non-volatile memory storing a control program and control data in advance. The ROM 22 is incorporated into the IC card 2 with the control program and the control data already stored at the manufacturing stage. In other words, the control program and the control data stored in the ROM 22 are incorporated depending on the specification of the IC card 2, etc. in advance.

The RAM 23 is a volatile memory. The RAM 23 temporarily stores data of the processor 21 during processing. For example, the RAM 23 functions as a calculation buffer, reception buffer and transmission buffer. The calculation buffer temporarily stores the results, etc. of the various calculation processing executed by the processor 21. The reception buffer holds command data, etc. received from the reader writer 15 via the communication unit 25. The transmission buffer holds messages (response data), etc. to be transmitted to the reader writer 15 via the communication unit 25.

The NVM 24 (storage) is constituted by a non-volatile memory capable of writing and rewriting data, such as a flash ROM. The NVM 24 stores control programs, applications and various data depending on the operational use of the IC card 2. For example, program files and data files are created using the NVM 24. Each of the created files is written with control programs and various data.

Further, the NVM 24 stores authentication lists, etc. Matters regarding the authentication list will be described later.

The communication unit 25 is an interface for transmitting/receiving data to/from the reader writer 15. In other words, the communication unit 25 is an interface for transmitting/receiving data to/from the IC card processing device 1.

If the IC card 2 is a contact-type IC card, the communication unit 25 is configured by a communication controller and a contact section for transmission/reception of signals through physical and electrical contact with the reader writer 15. For example, the IC card 2 is activated by receiving supply for the operation power and the operation clock from the reader writer 15 via the contact section.

If the IC card 2 is a non-contact type IC Card, the communication unit 25 is configured by a communication controller and an antenna, the communication controller being a modulation/demodulation circuit for performing wireless communication with the reader writer 15. The IC card 2 receives, for example, radio waves from the reader writer 15 via the antenna and modulation/demodulation circuit. The IC card 2 generates the operation power and the operation clock by a power source (not shown) from the radio waves for activation.

Further, the communication unit 25 is an interface for transmitting/receiving data to/from the MPU 26. The communication unit 25 obtains the verification result of a fingerprint through the MPU 26.

The MPU 26 processes the fingerprint information from the fingerprint sensor 27. The MPU 26, for example, performs verification processing of the fingerprint information from the fingerprint sensor 27. In other words, the MPU 26 determines whether or not the fingerprint information from the fingerprint sensor 27 matches with the preset fingerprint information. The MPU 26 transmits the verification result to the processor 21 via the communication unit 25.

The fingerprint sensor 27 obtains fingerprint information (biological information) which shows a fingerprint from a finger of a user. The fingerprint sensor 27, for example, comprises a capacitance type fingerprint sensor. The fingerprint sensor 27 transmits the fingerprint information to the MPU 26. The fingerprint information is, for example, a fingerprint image derived from a size of the capacitance.

The fingerprint sensor 27 may extract features from the fingerprint image and generate fingerprint information indicating the features. The fingerprint sensor 27 may transmit the generated fingerprint information to the MPU 26.

Next, the authentication list will be explained.

The authentication list shows multiple authentication methods for authenticating the user possessing the IC card 2. The authentication list shows authentication methods corresponding to the condition(s) for the processing performed with the use of the IC card 2. More specifically, the authentication list may show an authentication method corresponding to the condition(s) regarding the amount of money (for example, for a withdrawal or settlement) for a processing operation performed with the use of the IC card 2. Furthermore, the authentication list may show multiple authentication methods for the same condition. For example, the authentication list may show a priority order of authentication methods corresponding to the condition. That is, the authentication list shows both an authentication method performed first, and an authentication method to be performed subsequently when the first method fails.

FIG. 3 shows a configuration example of the authentication list. As shown in FIG. 3, the authentication list stores the "priority", "authentication method" and "condition" in association with one another.

The "priority" indicates a priority order of the authentication method. In other words, the "priority" shows a priority order of the authentication methods corresponding to the same condition. The "priority" here indicates a higher priority order when the number is younger.

The "authentication method" shows authentication methods for authenticating the user using the IC card 2. For example, the "authentication method" includes the authentication method for authenticating with the use of information from the sensor, such as the fingerprint sensor 27. The "authentication method" here indicates "fingerprint authentication", "offline PIN authentication", "handwritten signature" or "online PIN authentication."

The "fingerprint authentication" is an authentication method for checking the fingerprint information obtained through the fingerprint sensor 27 against preset fingerprint information (fingerprint information stored in the NVM 24, etc.).

The "offline PIN authentication" is an authentication method for checking the PIN input to the operation unit 16, etc. of the IC card processing device 1 against a PIN previously stored in the NVM 24, etc.

The "handwritten signature" is an authentication method for checking the signature input to the operation unit 16, etc. of the IC card processing device 1, against a pre-registered signature. For the "handwritten signature", the signature may be checked either by the processor 21 of the IC card 2 or by the server 10.

The "online PIN authentication" is an authentication method which lets the server 10 check the PIN input to the operation unit 16, etc. of the IC card processing device 1. For example, the processor 11 of the IC card processing device 1 transmits the PIN input to the operation unit 16 etc. to the server 10. The server 10 checks the PIN received from the IC card processing device 1 against a pre-registered PIN. The server 10 transmits the verification result to the IC card processing device 1.

The "condition" indicates a condition for adopting the corresponding "authentication method." The "condition" here is a monetary condition (an amount of money) related to the processing using the IC card 2. In the example shown in FIG. 3, the "condition" is "transaction amount 10000 JPY or over" or "transaction amount under 10000 JPY."

In the example shown in FIG. 3, the authentication list indicates "fingerprint authentication" as a method of authentication if the amount of the processing using the IC card 2 is 10000 JPY or over.

Further, in the authentication list, when the amount of the processing using the IC card 2 is below 10000 JPY, the indicated authentication method is "offline PIN authentication", "handwritten signature" and "online PIN authentication." The authentication list indicates that the priority order declines in the order of "offline PIN authentication", "handwritten signature" and "online PIN authentication."

The authentication list is not limited to a specific structure or configuration.

The authentication list is stored in the NVM 24 in advance. The authentication list is, e.g., stored in the NVM 24 when issuing the IC card 2.

The authentication list is, e.g., a CVM (Cardholder Verification Method) list.

Next, the functions realized by the IC card 2 will be explained. The functions of the IC card 2 are realized by the processor 21 executing a program stored in the ROM 22 or NVM 24, or the like.

The processor 21 has a function of determining the authentication method for authenticating the user from a plurality of authentication methods indicated in the authentication list.

It is assumed here that the user sets the IC card 2 to the reader writer 15 so that the IC card processing device 1 and the IC card 2 are able to communicate. It is further assumed that the user is to perform a predetermined processing operation (for example, the withdrawal or payment of money) using the IC card 2.

The processor 21 transmits the authentication list through the communication unit 25 to the IC card processing device 1.

The processor 11 of the IC card processing device 1 obtains the authentication list through the reader writer 15. When the authentication list is obtained, the processor 11 specifies the processing using the IC card 2 based on the operation from the user, etc. For example, the processor 11 accepts the input of the amount related to the processing using the IC card 2.

When the processing is specified, the processor 11 obtains the authentication method corresponding to the specified processing from the received authentication list. When the authentication method is obtained, the processor 11 transmits information indicating the obtained authentication method (for example, the authentication command showing the authentication method) through the reader writer 15 to the IC card 2.

The processor 21 of the IC card 2 obtains this information through the communication unit 25. When the information is obtained, the processor 21 determines, as the authentication method for authenticating the user, the authentication method indicated by the information.

The processor 21 does not need to transmit the authentication list to the IC card processing device 1. In this case, the processor 11 of the IC card processing device 1 transmits to the IC card 2, through the reader writer 15, information (e.g., the information showing the amount of money) showing the processing that makes use of the IC card 2.

The processor 21 of the IC card 2 receives this information through the communication unit 25. When the information is received, the processor 21 obtains the authentication method corresponding to the processing indicated by the information from the authentication list. When the authentication method is obtained, the processor 21 determines that the obtained authentication method is the authentication method for authenticating the user.

Further, the processor 21 has a function of authenticating the user based on the determined authentication method.

When the authentication method is determined, the processor 21 authenticates the user in accordance with this authentication method.

For example, when the authentication method is a fingerprint authentication, the processor 21 obtains user fingerprint information through the fingerprint sensor 27. When the fingerprint information is obtained, the processor 21 checks the obtained fingerprint information. For example, the processor 21 checks the obtained fingerprint information against preset fingerprint information using the MPU 26.

Further, when the authentication method is an offline PIN authentication, the processor 21 checks the PIN included in the authentication command against a preset PIN. If the PIN is not included in the authentication command, the processor 21 may, via the communication unit 25, transmit a response requesting the PIN to the IC card processing device 1.

When the checking is successful, the processor 21 transmits, via the communication unit 25, a response indicating that the verification was successful to the IC card processing device 1.

Further, the processor 21 has a function to check for whether there is an abnormality in the sensor such as the fingerprint sensor 27.

For example, if the verification of the authentication processing fails, the processor 21 checks if there is an abnormality in the sensor used in the authentication processing. In an exemplary instance, if the verification of fingerprint information (fingerprint authentication) fails, the processor 21 checks if there is an abnormality in the fingerprint sensor 27.

For example, the processor 21 checks for an abnormality with a predetermined self-diagnosis program. The processor 21 checks whether there is an abnormality in the sensor by checking the signal from the sensor (for example, the fingerprint sensor 27) in accordance with the self-diagnosis program. The processor 21 may run the self-diagnosis program multiple times to determine if there is an abnormality in the sensor when an abnormality is detected consecutively. The method of the processor 21 checking for an abnormality in the sensor is not limited to a specific method.

Further, the processor 21 may check for an abnormality in the sensor in accordance with the command from the IC card processing device 1 at the activation of the IC card 2.

In addition, the processor 21 has a function of updating the authentication list when an abnormality in the sensor has been determined.

The processor 21 updates the contents concerning the authentication method using information from the sensor determined as being abnormal. In other words, the processor 21 updates the authentication list so as not to perform the authentication method using information from the sensor determined as being abnormal. The following explains what happens when the processor 21 determines that the fingerprint sensor 27 is abnormal.

The processor 21 updates the contents concerning the authentication method (in other words, fingerprint authentication) using information (in other words, fingerprint information) from the fingerprint sensor 27. For example, the processor 21 substitutes the "fingerprint authentication" with other authentication methods in the authentication list. More specifically, the processor 21 may change the "fingerprint authentication" to "offline PIN authentication." Particulars of the change may be prescribed in the program in advance and stored in the ROM 22 or NVM 24.

FIG. 4 shows the configuration example of the authentication list where the processor 21 has changed the "fingerprint authentication" to a different authentication method. As shown in FIG. 4, the authentication list indicates "offline PIN authentication" as an authentication method corresponding to "transaction amount of 10000 JPY or over."

The processor 21 may instead delete the "fingerprint authentication" from the authentication list. In other words, the processor 21 may delete the "fingerprint authentication", a "condition" corresponding to the "fingerprint authentication", and a "priority" corresponding to the "fingerprint authentication." The processor 21 may elevate the "priority" which is subsequent to the deleted "priority." How the deletion and elevation should be performed may be prescribed in the program in advance and stored in the ROM 22 or NVM 24.

FIG. 5 shows the configuration example of the authentication list where the processor 21 has deleted the "fingerprint authentication". As shown in FIG. 5, the "fingerprint authentication", "priority" and "transaction amount 10000 JPY or over" are deleted from the authentication list. In the authentication list, the "priority" subsequent to the "priority" of the "fingerprint authentication" is elevated.

If the processor 21 deletes the "fingerprint authentication", "priority" and "transaction amount 10000 JPY or over" from the authentication list, and there is no other authentication method corresponding to "transaction amount 10000 JPY or over", the IC card 2 cannot perform authentication processing for "transaction amount 10000 JPY or over."

The processor 21 may set a limit regarding the authentication processing of the IC card 2 when the authentication list is updated. For example, the processor 21 may set a limit on a number of times for which authentication processing can be performed, or a time limit for the authentication processing of the IC card 2.

When the authentication method is changed (for example, in the case of FIG. 4), the processor 21 may set a limit regarding the authentication method after the change. More specifically, the processor 21 may set a limit on the number of times or a time limit for the authentication method after the change.

When the authentication list is updated, the processor 21 determines if authentication processing corresponding to the processing using the IC card 2 is on the authentication list. When the authentication processing corresponding to the processing using the IC card 2 is determined to be on the authentication list, the processor 21 returns to the process of determining the authentication method for authenticating the user from the authentication methods indicated on the authentication list.

In addition, when it is determined that the authentication processing corresponding to the processing using the IC card 2 is not on the authentication list, the processor 21 transmits to the IC card processing device 1, through the communication unit 25, a response indicating that the authentication processing has failed.

Further, when it is determined that there is no abnormality in the sensor, the processor 21 transmits to the IC card processing device 1, through the communication unit 25, a response indicating that the authentication processing has failed.

Next, the operational example of the IC card 2 will be explained.

Figure 6:
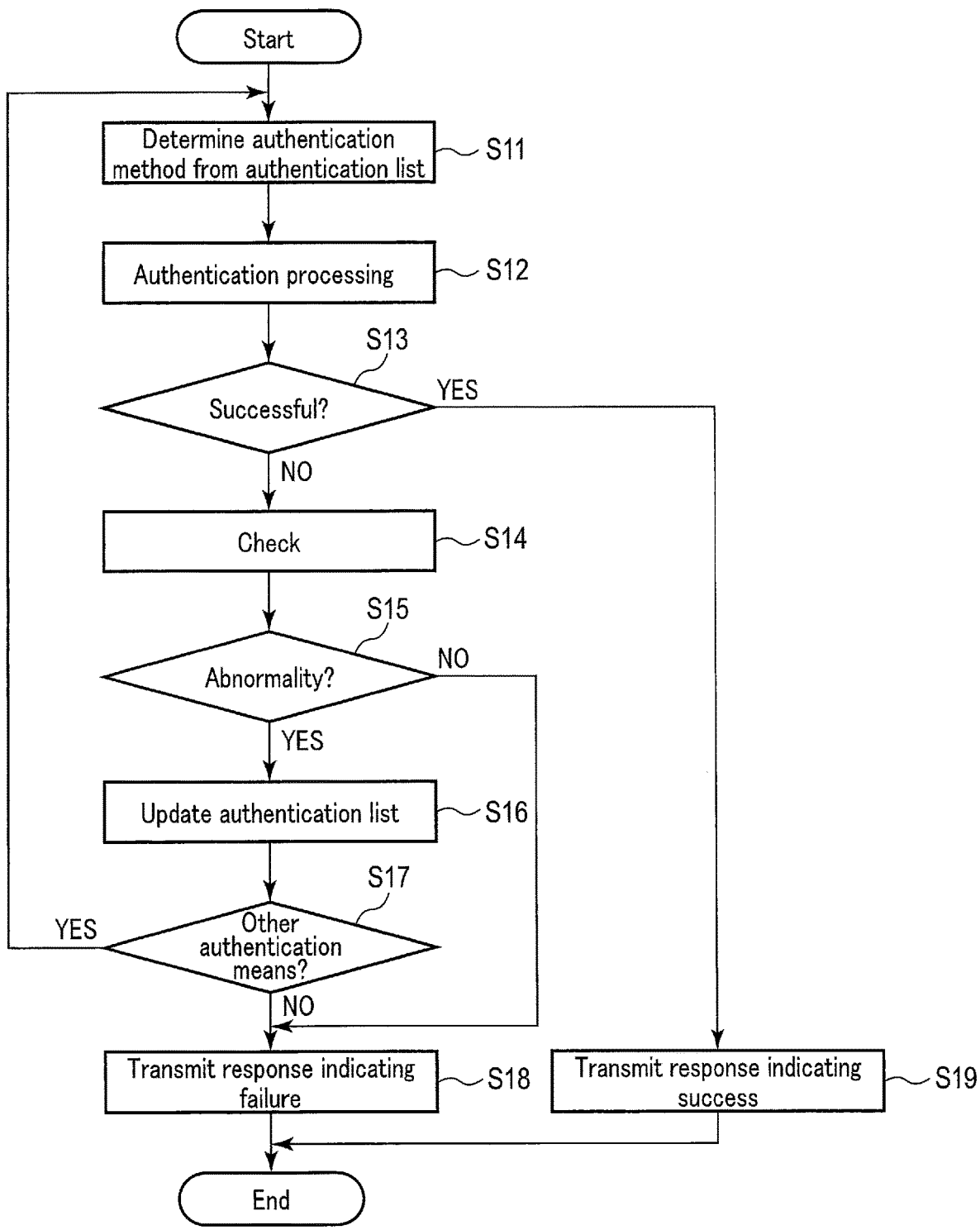
FIG. 6 is a flowchart showing an operation example of an IC card according to an embodiment.

FIG. 6 is a flowchart showing an operation example of the IC card 2. It is assumed here that the user sets the IC card 2 to the reader writer 15 so that the IC card processing device 1 and the IC card 2 are able to communicate. It is further assumed that the user is to perform a predetermined processing operation (for example, the withdrawal or payment of money) using the IC card 2.

First, the processor 21 of the IC card 2 determines the authentication method for authenticating the user from multiple authentication methods indicated on the authentication list (S11). When the authentication method is determined, the processor 21 performs the authentication processing in accordance with the determined authentication method (S12).

If the authentication fails (S13, NO), the processor 21 checks if there is an abnormality in a sensor used in the authentication processing (S14).

When it is determined that there is an abnormality in the sensor (S15, YES), the processor 21 updates the authentication list in accordance with the update method and steps stored in the ROM 22 or NVM 24 (S16). When the authentication list is updated, the processor 21 determines if the authentication method corresponding to the aforementioned processing is on the authentication list (S17).

When it is determined that the authentication method corresponding to the aforementioned processing is on the authentication list (S17, YES), the processor 21 returns to S11.

When it is determined that there is no abnormality in the sensor (S15, NO) or determined that the authentication method corresponding to the aforementioned processing is not on the authentication list (S17, NO), the processor 21 transmits a response indicating that the authentication has failed to the IC card processing device 1 through the communication unit 25 (S18).

When the authentication is successful (S13, YES) the processor 21 transmits a response indicating that the authentication was successful to the IC card processing device 1 through the communication unit 25 (S19).

When the response indicating that the authentication has failed is transmitted to the IC card processing device 1 (S18), or when a response indicating that the authentication was successful is transmitted to the IC card processing device 1 (S19), the processor 21 ends the operation.

Note that when the processor 21 performs the authentication process without the sensor (offline PIN authentication etc.) in S12, there may not be a need to perform S14 to S17. In other words, the processor 21 will move to S19 if the authentication is successful, and will move to S18 if unsuccessful.

Further, the processor 21 may notify the IC card processing device 1 that the authentication list has been updated. In this case, the processor 11 of the IC card processing device 1 may, through the communication unit 18, provide notification of the authentication list having been updated (or the sensor being abnormal) to the server 10. Further, the processor 11 may present to the user the fact that the authentication list has been updated (or the sensor is abnormal) through the display 17, etc.

In addition, the IC card 2 may comprise a sensor for obtaining other biological information. More specifically, the IC card 2 may comprise a sensor for obtaining an iris, vein or voiceprint.

The IC card configured as above determines whether there is an abnormality in the sensor for obtaining information used in the authentication processing. When the IC card determines that there is an abnormality in the sensor, the contents of the authentication processing in the authentication list are updated. As a result, the IC card can perform other authentication processing when there is an abnormality in the sensor. Therefore, the convenience of the IC card is improved. Further, even in cases of attempted fraud, where, for example, a finger may be deliberately changed to trigger a failure of fingerprint authentication and to change the authentication method from the fingerprint authentication to offline PIN, the embodiment performs the operation check of the fingerprint sensor itself; thus, the security level cannot be easily diminished and this will also improve the convenience of the IC card.

In addition, the IC card can present to the user the fact that there is an abnormality in the sensor by updating the authentication list.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An IC card comprising:
    a sensor configured to obtain information for authentication;
    a storage configured to store an authentication list indicating an authentication method that uses the information from the sensor; and
    a processor configured to determine if there is an abnormality in the sensor and
    update the authentication list if it is determined that there is the abnormality in the sensor,
    wherein the authentication list stores the authentication method and a condition for using the authentication method in association with each other; and
    the processor is configured to delete from the authentication list the authentication method and the condition corresponding to the authentication method that uses the information, from the sensor determined as being abnormal.

2. The IC card according to claim 1, wherein the processor is configured to change the authentication method that uses the information from the sensor determined as being abnormal to another authentication method on the authentication list.

3. The IC card according to claim 1, wherein the sensor is configured to obtain biological information.

4. The IC card according to claim 3, wherein the sensor is configured to obtain fingerprint information.

5. The IC card according to claim 1, wherein the authentication list is a Cardholder Verification Method (CVM) list.

6. The IC card according to claim 1, wherein the processor is configured to determine, if authentication by the authentication method shown in the authentication list fails, abnormality in the sensor for obtaining the information used in the authentication method.

7. The IC card according to claim 1, wherein the abnormality in the sensor is determined at activation of the IC card.

8. An IC card comprising:
a module comprising a sensor configured to obtain information for authentication, a storage configured to store an authentication list indicating an authentication method that uses the information from the sensor, and a processor configured to determine if there is an abnormality in the sensor and update the authentication list if it is determined that there is the abnormality in the sensor, and
a body including the module,
wherein the authentication list stores the authentication method and a condition for using the authentication method in association with each other; and
the processor is configured to delete from the authentication list the authentication method and the condition corresponding to the authentication method that uses the information from the sensor determined as being abnormal.

9. An IC card processing method performed by a processor, the method comprising:
determining if there is abnormality in a sensor for obtaining information for authentication; and
updating an authentication list showing an authentication method that uses the information from the sensor if it is determined that there is the abnormality in the sensor,
wherein the authentication list stores the authentication method and a condition for using the authentication method in association with each other; and
the updating, is deleting frim the authentication list the authentication method and the condition corresponding to the authentication method that uses the information from the sensor determined as being abnormal.

10. A portable electronic device comprising:
a sensor configured to obtain information for authentication;
a storage configured to store an authentication list indicating an authentication method that uses the information from the sensor; and
a processor configured to determine if there is an abnormality in the sensor and update the authentication list if it is determined that there is the abnormality in the sensor,
wherein the authentication list stores the authentication method and a condition for using the authentication method in association with each other; and
the processor is configured to delete from the authentication list the authentication method and the condition corresponding to the authentication method that uses the information from the sensor determined as being abnormal.

11. A processor-executable program which when executed by a processor causes the processor to:
determine if there is abnormality in a sensor for obtaining information for authentication; and
update an authentication list showing an authentication method that uses the information from the sensor if it is determined that there is an abnormality in the sensor,
wherein the authentication list stores the authentication method and a condition for using the authentication method in association with each other; and
the updating, is deleting from the authentication list the authentication method and the condition corresponding to the authentication method that uses the information from the sensor determined as being abnormal.

* * * * *